United States Patent [19]

Miyata et al.

[11] Patent Number: 4,785,728
[45] Date of Patent: Nov. 22, 1988

[54] ROTARY PICKLES MAKING DEVICE

[75] Inventors: Makoto Miyata, Yawata; Yoshiyuki Ishida, Kawanishi, both of Japan

[73] Assignee: Matsushita Electric Works, Ltd., Osaka, Japan

[21] Appl. No.: 113,509

[22] Filed: Oct. 28, 1987

[30] Foreign Application Priority Data

Nov. 15, 1986 [JP] Japan ................................. 61-272429
Dec. 23, 1986 [JP] Japan ................................. 61-306744

[51] Int. Cl.$^4$ .......................... A23B 7/10; A23L 1/218
[52] U.S. Cl. ........................................ 99/535; 99/467; 366/105; 366/233
[58] Field of Search ........................... 99/516, 534–536, 99/467, 468, 353; 366/233, 234, 101, 105

[56] References Cited

U.S. PATENT DOCUMENTS

| 227,120 | 5/1880 | Metcalf ................................. 366/233 |
| 1,713,245 | 5/1929 | Weiss et al. ........................... 366/233 |
| 3,942,769 | 3/1976 | Whiteside et al. .................... 366/233 |

FOREIGN PATENT DOCUMENTS

| 2460113 | 2/1981 | France ................................. 99/535 |
| 54-95783 | 7/1979 | Japan . |
| 61-167781 | 10/1986 | Japan . |
| 62-4986 | 1/1987 | Japan . |

Primary Examiner—Timothy F. Simone
Attorney, Agent, or Firm—Burns, Doane, Swecker & Mathis

[57] ABSTRACT

A rotary pickles making device comprises a base body including spaced drive and guide rollers rotatably mounted in the body, and a drum-shaped pickling casing for containing therein pickling stuffs. The casing is placed on the drive and guide rollers to be rotated thereby. The pickling casing is provided with an opening closed by a detachable cap for introducing and ejecting the pickling stuffs. A chamber is defined between the cap and an apertured sheet extending across the opening for adjusting the gas and liquid content of the pickling stuffs during a pickling operation.

9 Claims, 4 Drawing Sheets

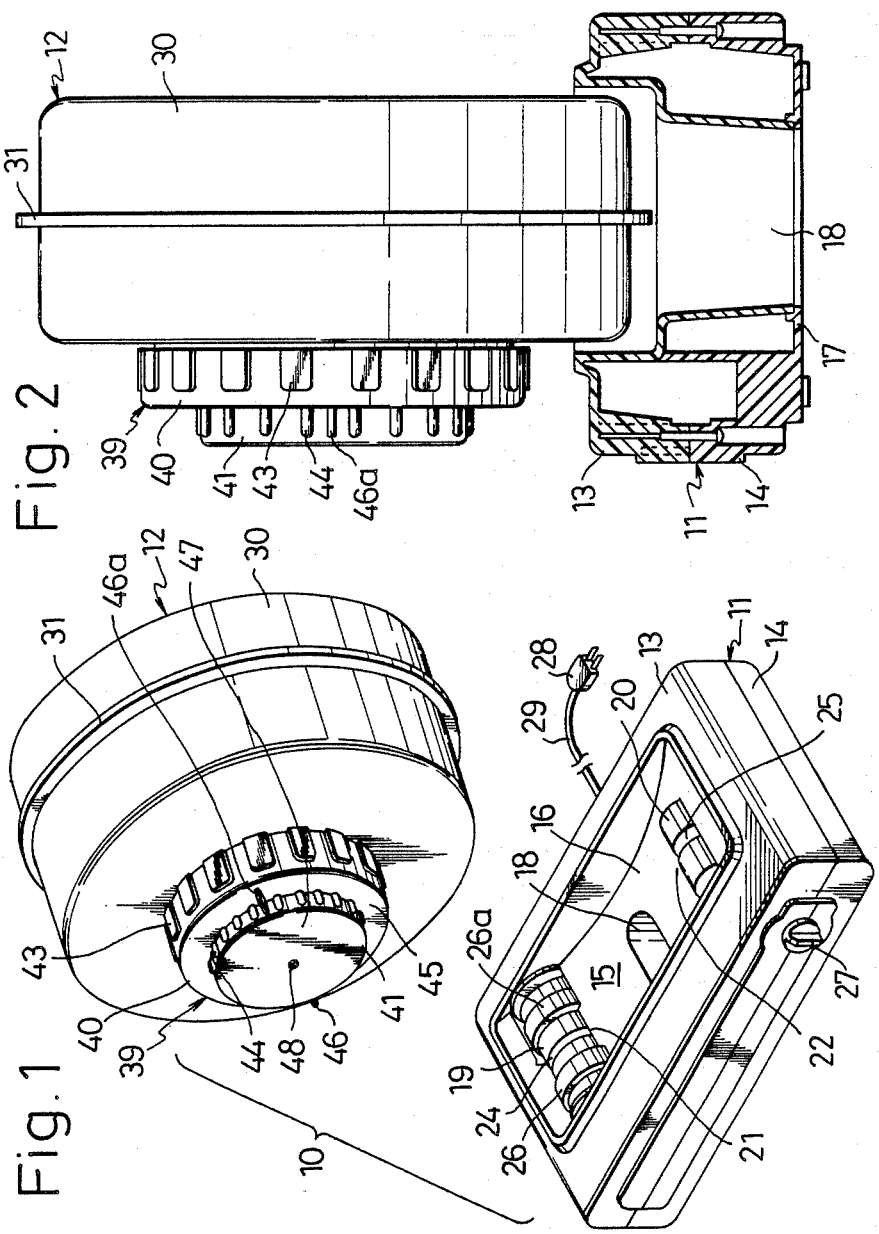

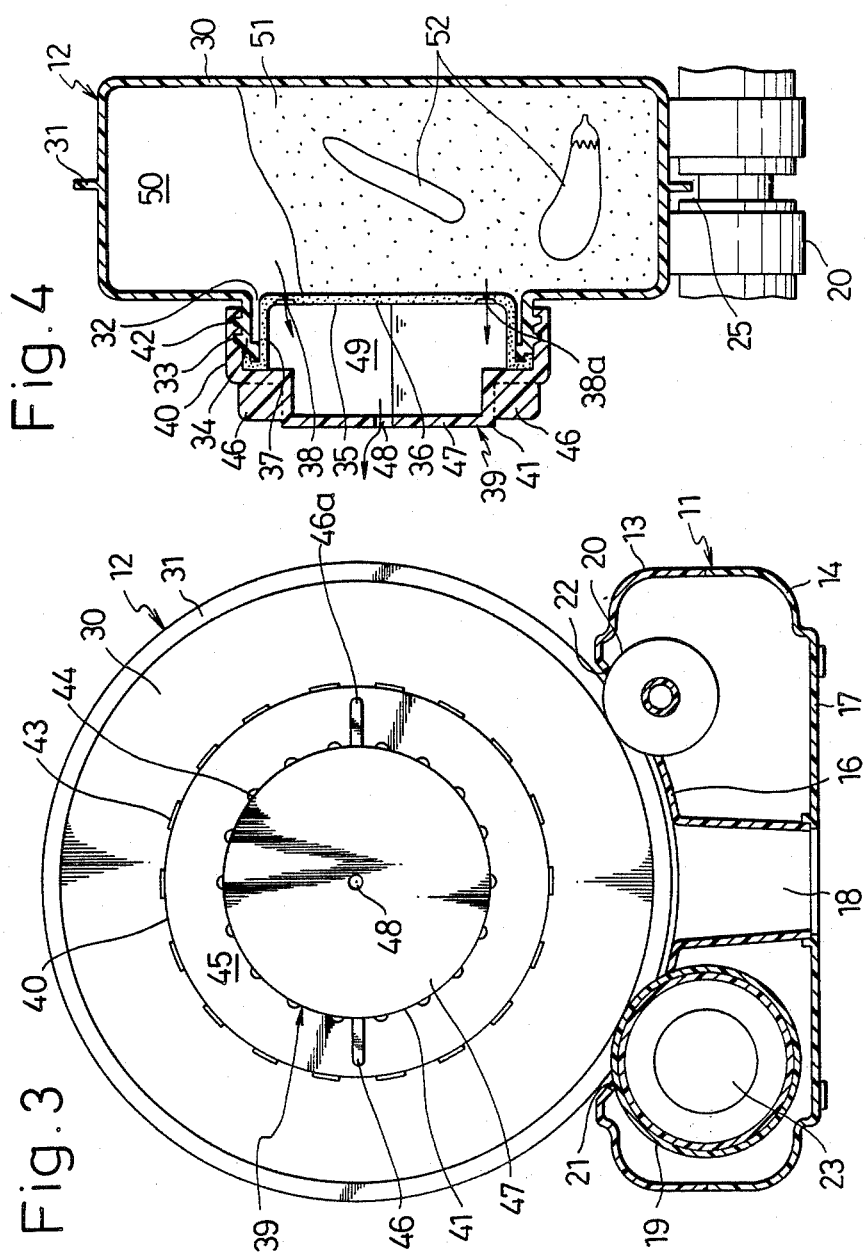

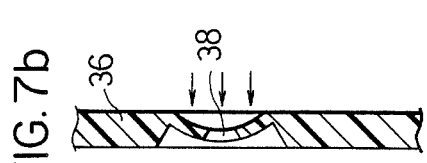
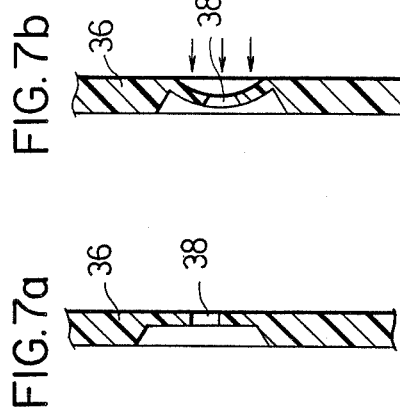
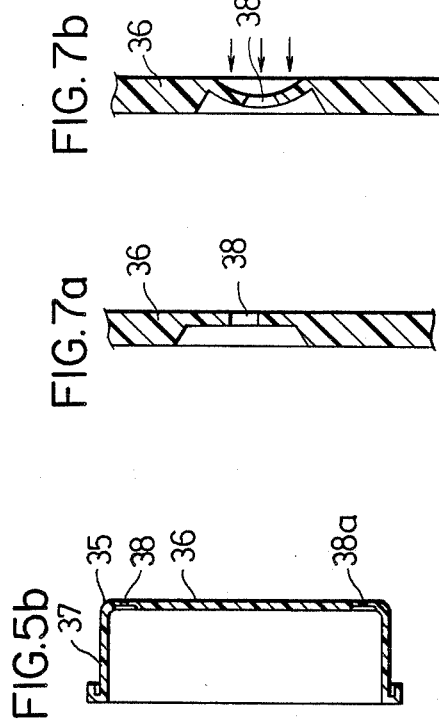
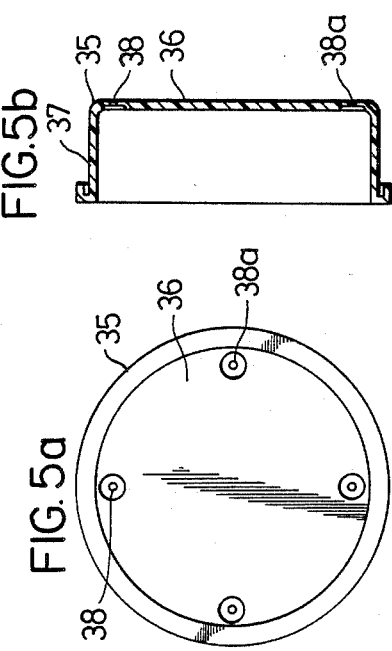
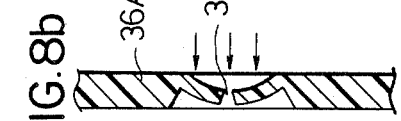
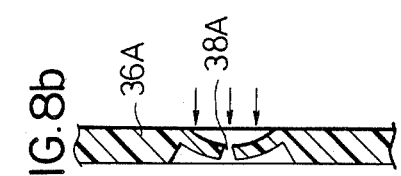
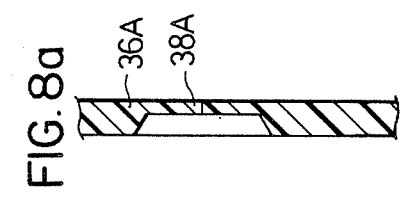
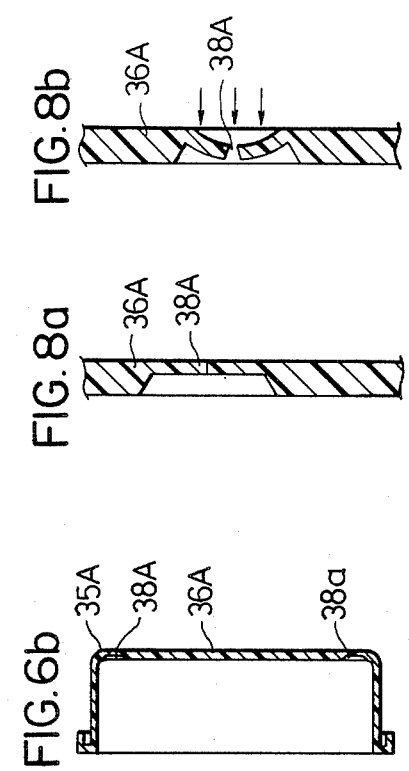

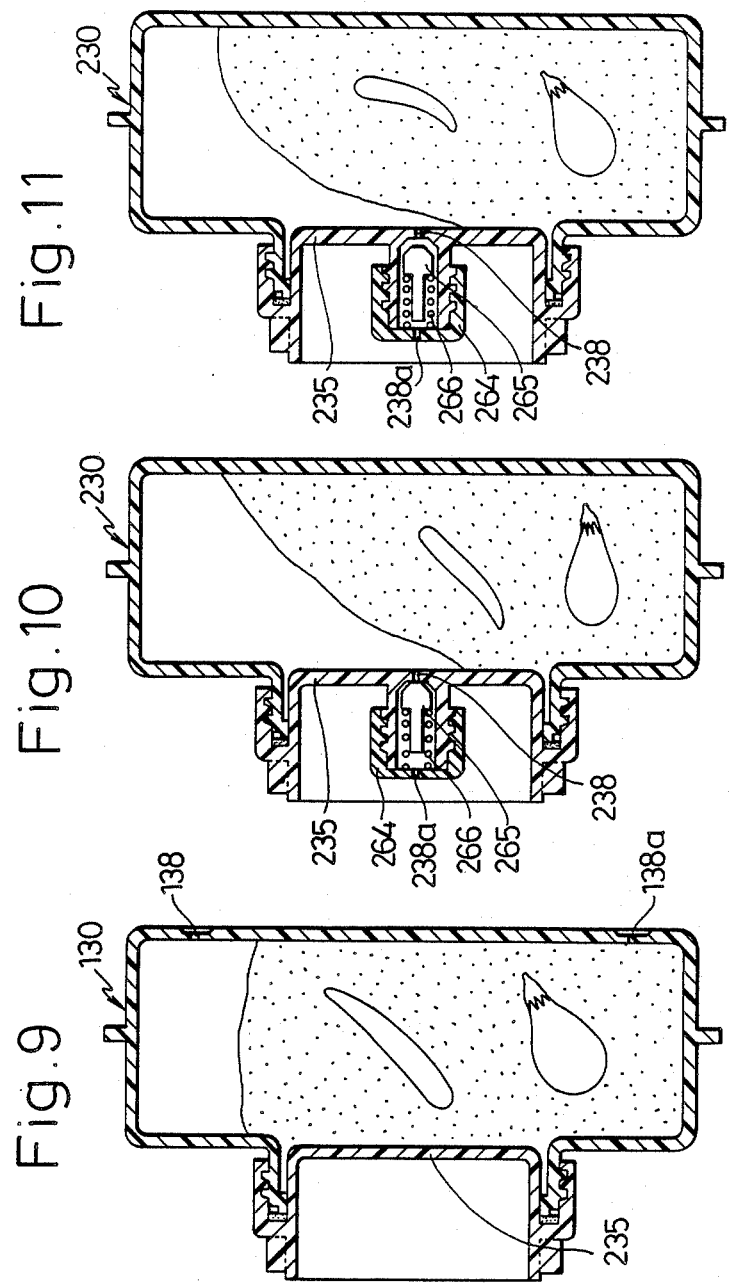

ROTARY PICKLES MAKING DEVICE

TECHNICAL BACKGROUND OF THE INVENTION

This invention relates generally to devices for making pickles and, more particularly, to a rotary pickles making device in which a pickling casing is rotated to agitate a pickling bed of rice-bran paste containing foodstuffs to be pickled.

A pickles making device as described above is useful as it allows a pickling bed to be formed in the pickling casing with rice bran fermented therein with a proper amount of salt and water admixed, and such foodstuffs as vegetables pickled to be embedded in the bed and affected by a fermentation of the paste to be seasoned to a traditional Japanese pickles flavor and taste.

DISCLOSURE OF PRIOR ART

It is considered that the rice bran ferments mainly with lactic fermentation accompanied by yeast fermentation, so as to be able to have the foodstuffs seasoned to be peculiarly tasty, but the pickling bed of rice-bran paste in the fermentation is in the process of metabolism in which the state is always variable and unstable. During the process, it is necessary to sufficiently agitate the pickling bed to supply air within the bed so that in particular lactobacillus showing slight aerobic property can be preserved while unnecessary propagation of, for example, butylic acid bacteria that shows anaerobic property and gives ill influence on the bed can be restrained. When the air supply is not sufficient, the propagation of butylic acid bacteria and the like becomes excessive in the bed so as to render the bed to be odorous and diminish the flavor of pickles.

As a known pickling casing for the device of the kind referred to, there has been suggested in Japanese Utility Model Application Laid-Open Publication No. 62-4986 by Isamu Kuroda a container of an elongated cylindrical contour and axially rotatable, in which a plurality of longitudinal slats are disposed to form a cylindrical peripheral wall of the container and to be respectively slidable in the circumferential direction while leaving open a portion of the peripheral wall for a certain circumferential angle. In this pickling container, the respective divided plates are sequentially slid circumferentially while constantly retaining the open portion, so as to have the casing thereby rotated. The rotation will cause the pickling bed of rice-bran paste to be subjected to a sequential position shift and supplied with air, while the retained opening can be contributive to an introduction and ejection of the pickling stuffs.

In this known pickling casing, however, there have been involved such drawbacks that, due to the presence of the constantly upwardly open portion, a required sanitation cannot be maintained because of possible entry of dirt or foreign matter. Also, the pickling bed is likely to become excessive in water content due to liquid coming out of the vegetables or the like foodstuffs to be pickled during the pickling operation since the container is not provided with means for avoiding such excessive water content.

A primary object of the present invention is, therefore, to provide a rotary pickles making device having a pickling casing which can maintain a highly sanitary state with any possible introduction of dirt or foreign matter reliably eliminated, and can automatically discharge any excessively generated gas and water content of the pickling bed of rice-bran paste inside the casing.

SUMMARY OF THE INVENTION

According to the present invention, the above object can be realized by providing a rotary pickles making device which comprises a pickling casing in which a pickling bed of rice-bran paste is formed for foodstuffs introduced therein, and means for rotatably driving the pickling. The pickling casing is provided with an opening having a detachable closure cap for introduction and ejection of pickling stuffs and with a gas-liquid adjusting means capable of passing therethrough internally generated gas and water.

With the rotary pickles making device comprising such a unique pickling casing, the interior of the pickling space can be kept substantially isolated from the exterior so that any dirt or foreign matter is not allowed to enter thereinto, while any excessively generated gas and liquid from the pickling bed can be automatically discharged out of the casing.

Other objects and advantages of the present invention shall become clear from following explanation of the invention detailed with reference to embodiments shown in accompanying drawings:

BRIEF EXPLANATION OF THE DRAWINGS

FIG. 1 shows in a perspective exploded view one embodiment of a rotary pickles making device of the present invention;

FIG. 2 is a side view of the assembled device of FIG. 1, with the base body shown in cross section;

FIG. 3 is a front view of the assembled device of FIG. 1, with the base body shown schematically in vertical section;

FIG. 4 shows in a cross section mainly the pickling casing in the device of FIG. 1;

FIGS. 5(a) and 5(b) are respectively a front view and a cross sectional view of a gas-liquid adjuster provided in the device of FIG. 1;

FIGS. 6(a) and 6(b) are respectively a front view and a cross sectioned view of the gas-liquid adjuster in another embodiment of the present invention;

FIGS. 7(a) and 7(b) are fragmentary cross-sectional views through one embodiment of the adjuster, depicting an adjusting operation of the gas-liquid adjuster of FIG. 5;

FIGS. 8(a) and 8(b) are fragmentary cross-sectional views through another embodiment of the adjuster, depicting an adjusting operation of the gas-liquid adjuster of FIG. 6;

FIG. 9 shows in a cross section still another embodiment of the gas-liquid adjuster; and FIGS. 10 and 11 show respectively in a cross section yet another embodiment of the gas-liquid adjuster in its non-actuated and actuated states.

While the present invention shall now be explained with reference to the embodiments shown, it is not intended to limit the invention only to such embodiments but is rather intended to cover all of modification, alterations and equivalent arrangements possible within the scope of appended claims.

DISCLOSURE OF PREFERRED EMBODIMENTS

Referring to FIGS. 1 through 5, there is shown a rotary pickles making device 10 according to the present invention, which comprises a generally flat and rectangular base body 11, and a hollow drum-shaped pickling casing 12 of a short cylindrical shape enclosed at both axial ends to define therein a pickling compartment. The base body 11 is formed with upper and lower housing halves 13 and 14 which are complementarily fitted to each other, while the upper housing half 13 is formed to define in the upper side face a relatively large recess 15 opened upwardly. The recess 15 has a bottom wall 16 which is curved arcuately in a longitudinal direction of the rectangular body 11, for receiving a peripheral part of the pickling casing 12, while the bottom wall 16 has substantially in the center a drain port 18 defined by side walls suspended from the bottom wall 16 to reach a bottom wall 17 of the lower housing half 14 where the latter is also opened correspondingly, for discharging any fluid from the upper side to the lower side of the base body 11.

In the base body 11, a drive roller 19 and a guide roller 20 are rotatably supported to lie in a widthwise direction and substantially in parallel relation to each other and are spaced in the longitudinal direction of the body 11, while being partly exposed in the recess 15 through apertures 21 and 22 made in the bottom wall 16. In the present instance, the drive roller 19 is provided to have a diameter relatively larger than the guide roller 20, while the latter is disposed to be at a higher level at its contacting point with the pickling casing 12 than the contacting point of the drive roller 19 with the casing 12. In this recess 15, an outer periphery of the pickling casing 12 sits on the spaced drive and guide rollers 19 and 20, so that the drum-shaped pickling casing 12 will be axially rotated while in frictional contact with the drive roller 19. In this case, it is preferable that the driving force of the drive roller 19 is obtained from a motor 23 disposed inside the drive roller 19 and held stationary with respect to the base body 11. Substantially in the center of the drive and guide rollers 19 and 20, respectively, a pair of guide grooves 24 and 25 is provided, while the drive roller 19 is provided on its periphery with slip-preventing ring members 26 and 26a preferably formed of a rubber material high in friction coefficient so that a sufficiently highly frictional contact will be assured between the drive roller 19 and the pickling casing 12.

On the front face of the base body 11, further, a power ON/OFF and time-setting knob 27 is mounted, which knob is coupled to a timer (not shown) connected to the motor 23 to conduct power thereto via cord 29 having at an end a plug 28 for connection with a commercial power source. By actuating the timer the motor 23 will be optimumly driven for a set time.

The short drum-shaped pickling casing 12 has a main body 30 provided on its periphery with a rib 31 radially outward projected to be engageable in the guide grooves 24 and 25 of the drive and guide rollers 19 and 20 when the pickling casing 12 is placed on these two rollers. While the main body 30 is made flat on its rear side face, its front face includes a circular opening 32, a peripheral edge of which is projected axially outward to form a wall 34 provided on its outer periphery with male screw threads 33. This opening 32 is preferably made to have a diameter about ½ of the diameter of the main body 30. In the opening 32, a gas-liquid adjuster 35 which substantially closes the opening is disposed. The adjuster 35 is formed as a dish shape sheet having a bottom face 36 disposed substantially flush with the front side face of the main body 30 and a peripheral wall 37 disposed close to the inner periphery of the port 34.

A radial flange along an end edge of the wall 37 is fitted to a front end edge of the wall 34. In the bottom face 36 of the adjuster 35, recessed and thinned portions are provided, in which portions small through holes 38 and 38a are made (see in particular FIG. 5). Instead of such holes 38 and 38a, it may be possible to provide short slits 38A and 38Aa, in the thinned portions in the bottom face 36A, as in FIGS. 6(a) and 6(b). Preferably, the gas-liquid adjuster 35 is made of such an elastic material as silicone rubber.

In the port 34 of the main body 30, a detachable closure cap 39 is fitted, and this cap 39 is formed into a double-cylinder structure including a larger diametered part 40 and a smaller diametered part 41. On the inner periphery of this larger part 40, female screw threads 42 are provided for meshing with the male screw threads 33 of the port 34, while outer peripheries of both parts 40 and 41 have regularly spaced radial projections 43 and 44 for easy finger gripping. A pair of diametrically opposing fins 46 and 46a are provided on a stepped part 45 connecting between the both parts 40 and 41, and a small through hole 48 is made in the center of front face wall 47 of the cap 39. When the cap 39 is screwed onto the wall 34 of the main body 30, the radial flange of the peripheral wall 37 of the adjuster 35 is tightly held between the front end edge of the wall 34 and the stepped part 45 of the cap as well as the larger diametered part 40 of the cap 39, so as to be fixed therebetween. A chamber or reservoir 49 is defined by the gas-liquid adjuster 35 and the wall 47 of the cap 39.

In the foregoing arrangement, substantially all component members except such electric parts as the motor 23 and so on may be formed with a plastics material, so that the device will be corrosionproof, light-weight, easy to clean and so on.

The operation of the rotary pickles making device according to the present invention as has been disclosed shall be explained next. The cap 39 is initially manually unscrewed from the main body of the pickling casing 12, the gas-liquid adjuster 35 is removed from the wall 34, pickling stuffs such as a batch of rice bran, salt and water respectively of a proper amount are introduced through the opening 32 into the pickling casing 12 while leaving a certain space 50 within the main body 30, and the stuffs are agitated within the casing to form a pickling bed 51. Any desired raw vegetables intended to be pickled are introduced into the pickling bed 51, whereafter the gas-liquid adjuster 35 is fitted to the port 34, and the cap 39 is secured to the port 34. The pickling casing 12 in this state is placed on the base body 11 of the device, to rest upon the drive and guide rollers 19 and 20 while being prevented from being tilted or caused to fall down by opposing side walls of the recess 15. The guide rib 31 of the casing 12 is engaged in the guide grooves 24 and 25 of the rollers 19 and 20. The setting knob 27 on the base body 11, which is ready to be supplied with a power through the plug 28 connected to a commercial power source, is operated to turn the device ON, and to set a desired driving time for the motor 23, for example, 2 hours or so. An electric power is supplied to the motor 23 for the set time to rotate the drive roller 19 rotated for the set time. Accompanying this rotation of the drive roller 19, the pickling casing 12 contacted therewith through the highly frictional, slip-preventing ring members 26 and 26a on the roller 19 is rotated at a predetermined rate.

While the pickling casing 12 is being thus rotated and the pickling of the foodstuffs 52 develops within the pickling bed 51 which itself is developing the fermentation, a gas is generated from the bed within the space 50. Such generated gas passes through uppermost ones of the small holes 38 and 38a of the adjuster 35 into the chamber 49, and is discharged therefrom through the hole 48 in the front wall 47 of the cap 39 to the exterior. Accompanying also the development of the pickling, there comes out from the foodstuffs a certain amount of excessive liquid, which flows through lowermost ones of the small holes 38 and 38a into the chamber 49. When the liquid inside the chamber 49 reaches about one half of the volume of the chamber 49, the liquid is caused to be discharged out of the cap 39 through the small hole 48 in the front face wall 47. As the gas or excessive liquid is generated within the main body 30 of the pickling casing 12. The internal gas or water pressure of the main body 30 rises, the thinned portions of the gas-liquid adjuster 35 having the small holes 38 and 38a are urged by such pressure to bulge toward the chamber 49 so as to reach such a state as shown in FIG. 7(b) from the original state of FIG. 7(a). (In the event where the slits 38A and 38Aa are provided as in FIGS. 6(a) and 6(b), the slits are deformed from the state of FIG. 8(a) to that of FIG. 8(b).) Thus, the holes (or slits) are enlarged to facilitate passage of the excessive gas or water smoothly to the chamber 49. When, on the other hand, the pickling bed 51 becomes short of liquid, the liquid retained in the adjuster chamber 49 is caused to return into the main body 30. Accordingly, the liquid amount of the pickling bed can be automatically adjusted.

With the foregoing arrangement of the device according to the present invention, the thinned portions are provided in the gas-liquid adjuster 35 only in the locations of the small holes 38 and 38a so that any possible damage due to excessive weakening of the adjuster 35 may be effectively prevented from occurring. As the thinned portions are formed in the form of small recess which facing the adjuster chamber 49, they can be subjected constantly to a rinsing action by the liquid in the chamber 49 while the pickling casing 12 is rotated so that any clogging of the small holes or slits can be prevented. This maintains a smooth communication between the interior of the main body 30 and the adjuster chamber 49. The rice-bran paste per se of the pickling bed 51 cannot pass through the small holes or slits of the gas-liquid adjuster to the adjuster chamber 49, but rather will be retained in the main body 30 by the adjuster 35. Thus, as the casing rotates, the pickling bed 51 will be constantly displaced with respect to the peripheral wall of the pickling casing 12 and will be thereby sufficiently agitated, and a sufficient amount of air will be supplied to the pickling bed 51. With such agitation of the pickling bed 51 for the air supply thereto, the pickling of the foodstuffs 52 is developed and they become edible as pickles after, for example, 2 to 3 hours. If required, the pickling casing 12 with the pickling bed and pickled foodstuffs retained therein may be stored either on a table or the like with the side of cap 39 facing upwardly, or in a place of constant temperature and humidity.

In the present invention, a variety of design modifications can be adopted. For example, the cap 39 of the pickling casing may be made of a transparent plastics material, so that the liquid within the cap 39 can be easily observed for a timely ejection of the liquid by removing the cap 39 from the wall 34 before the liquid amount reaches the level of the central hole 48 of the cap 39, that is, before reaching one half of the chamber 49. Further, as shown in FIG. 9, small holes 138 and 138a allowing the gas and liquid to pass therethrough may be provided in the rear side face of the main body 130 of the pickling casing. In this event, the gas-liquid adjuster may not be required and a closure cap 135 substantially of identical configuration to the foregoing adjuster may be screw-fastened to the port of the main body 130. In this particular event, the liquid will be directly discharged out of the main body 130 of the pickling casing but, in the state where the casing is placed on the base body 11, will flow down into the recess 15 of the base body 11 to be discharged down through the drain port 18 into a tray preferably placed beneath the port 18. As shown in FIG. 10, further, the gas-liquid adjusting means may comprise an adjusting cap 235 fitted to the opening of the main body 230 of the pickling casing and having a valve means 264, to act simultaneously as the cap and gas-liquid adjuster. In the valve means 264, a valve plunger 265 is biased by a coil spring 266 normally into a position closing a small hole 238 in the center of the bottom wall of the cap 235 while another small hole 238a is made in front side wall of the valve means 264. With this arrangement, it should be readily appreciated that the valve plunger 265 is shifted by the excessively rising gas or water pressure inside the main body 230 against the biasing force, so as to allow the gas or liquid to flow through the holes 238 and 238a to the exterior, as seen in FIG. 11.

Further, while the main body of the pickling casing has been referred to as being of a short cylindrical shape, it may be formed of a shape having rounded peripheral corners so that the diameter of the casing will be gradually reduced from the intermediate part having the radially outward guide rib toward front and rear side faces.

What we claim as our invention is:

1. A rotary pickles making device comprising a pickling casing defining therein a compartment for containing a pickling paste and foodstuffs to be pickled, and means for rotating said casing to mix the paste and foodstuffs, said casing including an opening to said compartment for enabling said compartment to be loaded and emptied, a closure cap detachably mounted to said opening, said cap including a wall, and a gas and liquid adjuster allowing internally generated gas and liquid to pass therethrough for adjusting the amounts of gas and liquid within said compartment, said gas and liquid adjuster comprising a sheet extending across said opening and retained between said cap and said casing, said sheet being spaced from said cap wall to define therewith a reservoir, said sheet including small through-holes for enabling gas and liquid to pass therethrough between said compartment and said reservoir.

2. A device according to claim 1, wherein said sheet is disk-shaped, a peripheral part of said sheet being tightly secured between said cap and said casing.

3. A device according to claim 2, wherein said casing comprises a drum-shaped main body having a side face containing said opening which is smaller in diameter than said main body, a cylindrical wall projecting outwardly from said opening and containing screw threads, said cap including screw threads removably securable to said screw threads of said wall.

4. A device according to claim 3, wherein said sheet includes thinned portions through which said through-holes extend, said through-holes being deformable in response to changes in internal pressure in said compartment to enlarge said through-holes in response to pressure increases and diminish said through-holes in response to pressure decreases.

5. A device according to claim 3, wherein said sheet comprises a flat bottom disposed substantially flush with said side face, said bottom including thinned portions through which said through-holes extend, said peripheral part of said sheet being held between said cap and said cylindrical wall.

6. A device according to claim 1, wherein said sheet is formed of an elastic material.

7. A device according to claim 1, wherein said sheet includes recesses defining thinned portions of said sheet through which said through-holes extend.

8. A device according to claim 7, wherein said holes are slit-shaped.

9. A device according to claim 1, wherein said through-holes are located closer to an outer peripheral edge of said sheet than to a center thereof.

* * * * *